United States Patent [19]

Rufray

[11] Patent Number: 4,868,660
[45] Date of Patent: Sep. 19, 1989

[54] CIRCUIT ARRANGEMENT FOR UNOBJECTIONABLE SWITCHING BETWEEN TV-CHANNELS AS IN A TV RECEIVER

[75] Inventor: Jean-Claude Rufray, Franzose, France

[73] Assignee: Deutsche Thomson-Brandt GmbH, Villingen-Schwenningen, Fed. Rep. of Germany

[21] Appl. No.: 238,239

[22] Filed: Aug. 30, 1988

[30] Foreign Application Priority Data

Sep. 4, 1987 [DE] Fed. Rep. of Germany ....... 3729599

[51] Int. Cl.⁴ .......................................... H04N 5/268
[52] U.S. Cl. .................................. 358/181; 358/191.1
[58] Field of Search ..................... 358/181, 191.1, 182

[56] References Cited

U.S. PATENT DOCUMENTS

| | | | |
|---|---|---|---|
| 3,619,495 | 11/1971 | Ito et al. ............................ | 358/182 |
| 4,259,690 | 3/1981 | Nakanishi et al. ............ | 358/191.1 X |
| 4,398,193 | 8/1983 | Kuniyoshi et al. ............ | 358/194.1 X |
| 4,636,864 | 1/1987 | Annegarn et al. ............... | 358/191.1 |
| 4,682,234 | 7/1987 | Naimpally ........................ | 358/181 X |
| 4,774,580 | 9/1988 | Miyasako ........................ | 358/181 X |
| 4,796,089 | 1/1989 | Imai et al. ....................... | 358/182 X |

FOREIGN PATENT DOCUMENTS

| | | | |
|---|---|---|---|
| 103315 | 3/1984 | European Pat. Off. ........ | 358/191.1 |
| 59-202778 | 11/1984 | Japan .................................. | 358/181 |
| 60-83430 | 5/1985 | Japan .................................. | 358/181 |
| 1533372 | 11/1978 | United Kingdom . | |

OTHER PUBLICATIONS abstract–"Television Receiver", Kokai 61-111079(A); 5/29/86, inventor S. Omatsu; assignee Sharp Corp.
abstract–"Television Receiver", Kokai 60-75178(A); 4/27/85, inventor–N. Kawaguchi; assignee–Matsushita.
abstract–"Video Switching Device", Kokai 60-429-90A; 3/7/85, inventor–Y. Edahiro; assignee–Matsushita.

Primary Examiner—Howard W. Britton
Assistant Examiner—E. Anne Faris
Attorney, Agent, or Firm—Joseph S. Tripoli; Eric P. Herrmann

[57] ABSTRACT

A TV receiver having circuitry for precluding objectionable display patterns during channel switching includes a frame store for successively storing frames of video signal being displayed. A controlled switch, responsive to the switching signal and a synchronizing component of the displayed signal provides video signal from the currently selected channel to display circuitry except during channel changes, at which time it provides video signal stored in the frame store to the display circuitry.

4 Claims, 1 Drawing Sheet

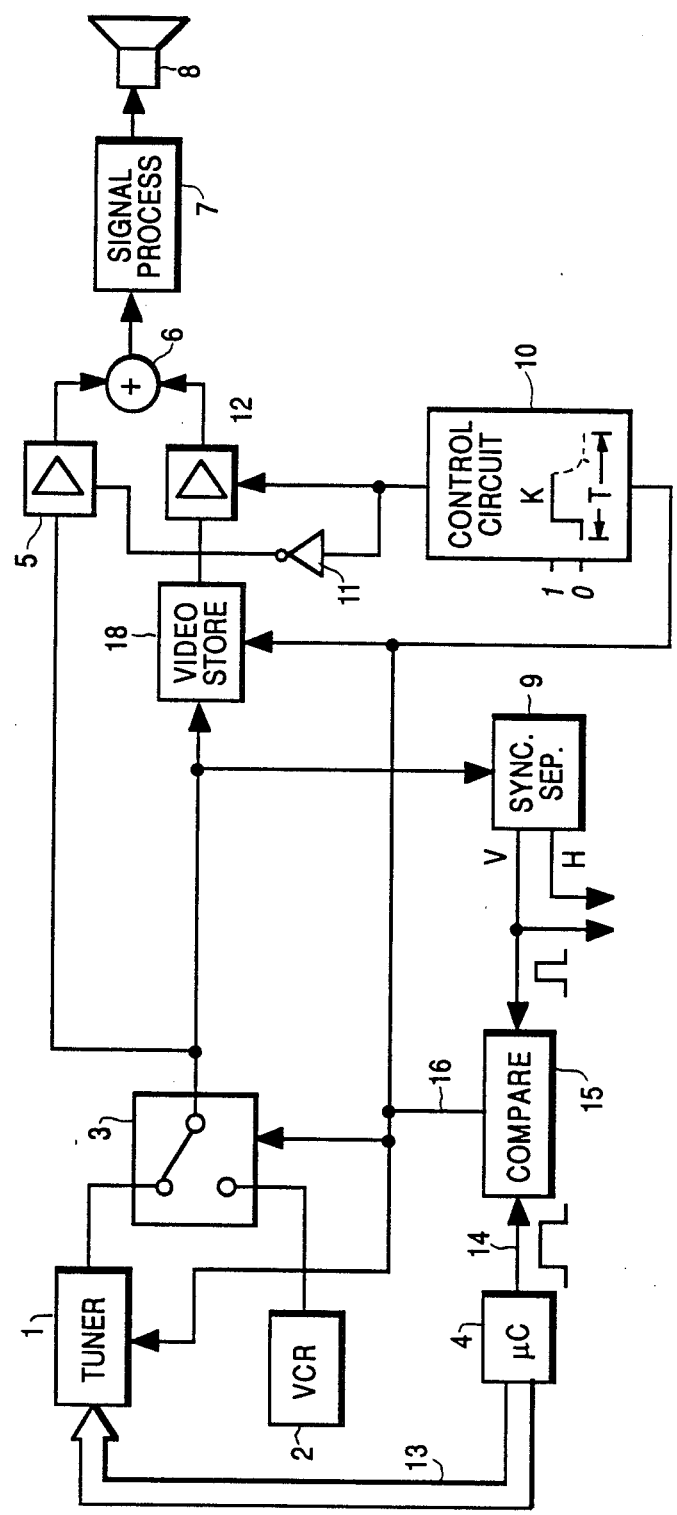

CIRCUIT ARRANGEMENT FOR UNOBJECTIONABLE SWITCHING BETWEEN TV-CHANNELS AS IN A TV RECEIVER

This invention relates to circuitry in a television (TV) receiver for switching between one channel and another without generating an objectionable display during switchover.

BACKGROUND OF THE INVENTION

In current TV receivers, switching between channels or between the tuner as a source of signal and for example a video recorder as a source of signal, produces a disturbed image for a period of time. This occurs because the receiver which is synchronized to the original signal requires time to self synchronize to the new signal. The period for achieving resynchronization is nominally several hundred milliseconds which corresponds to approximately seven frame intervals. In professional equipment switching artifacts are precluded because the signals from the different sources are synchronized to each other before switching is attempted. However it is not practical to incorporate such synchronization circuitry in home receivers.

An object of the invention is to provide cost effective apparatus in a consumer receiver to permit channel or source switching without generating an objectionable display during the switching interval.

SUMMARY OF THE INVENTION

The present invention is switching circuitry for a video signal processing system which permits switching between various video signals without generating objectionable display artifacts. Video signal from selection circuitry such as a tuner or a signal source selection switch is coupled to a first input terminal of a controllable signal combining means and to the input port of a frame store. Output signal from the frame store is coupled to a second input terminal of the controllable signal combining means. Control circuitry responsive to signal selection controls and synchronization components of the selected signal conditions the controllable signal combining means to provide signal from the frame store during switching intervals and signal from said selection circuitry at other times.

BRIEF DESCRIPTION OF THE DRAWING

The sole drawing is a block diagram of a portion of a TV receiver exemplifying the switching circuitry embodying the invention.

DETAILED DESCRIPTION

The video signal processing system in the FIGURE includes a first signal source, 1, which may be a tuner for the reception of several TV channels, and a second signal source, 2, which may be a video cassette recorder (VCR). Channel selection by the tuner, 1, is controlled by a microprocessor 4. Signals provided by the first and second sources are coupled to respective input terminals of a switch 3. An output terminal of the switch 3 provides video signal to the system processing circuits.

The operation of the circuit illustrated in the drawing will be described in terms of interchannel switching by the tuner. The system operates in similar fashion for intersource switching by the switch 3.

Assume that the tuner 1 is tune to a certain TV channel. Baseband video signal provided by the tuner is coupled to a controllable amplifier 5. The output signal from amplifier 5 is coupled to a signal adding circuit 6 the output of which is coupled to a display tube 8 via video signal processing circuitry 7. Video signal from the switch 3 is also coupled to circuitry 9, which, responsive to the synchronizing components of the video signal, extracts the horizontal and vertical synchronizing components and generates signals H and V having horizontal and vertical frequencies respectively. The signals H and V are coupled to deflection circuitry (not shown) for producing a raster scan on the display tube 8.

Video signal from the switch 3 is also coupled to the input terminal of a frame store circuit 18 which successively stores the current frame or field of video signal. Output signal from the frame store circuitry 18 is coupled to the input terminal of a second controllable amplifier 12. Output signal from amplifier 12 is coupled to a second input terminal of the signal adding circuit 6.

Amplifiers 5 and 12 are controlled by complementary signals provided by a control circuit 10, so that normally amplifier 5 applies the current video signal from switch 3 to the signal adding circuit 6 and amplifier 12 provides a zero value to signal adding circuit 6. During switching between channels or sources, amplifier 12 is conditioned to couple stored video signal from the frame store circuitry 18 to signal adding circuit 6 and amplifier 5 provides a zero value to signal adding circuit 6.

Amplifiers 12 and 5 may be gated amplifiers, that is, in response to control signals from control circuit 10, they are either turned on or off. Alternatively amplifiers 12 and 5 may be designed to multiply the respectively applied video signal by the factor K and its complement $1-K$ provided by circuit 10. In this instance the control signal K may gradually be incremented from values of $K=0$ to $K=1$ to effect a fading in of signal from amplifier 5 to signal from amplifier 12 and vice versa. The combination of signal adding circuit 6 and controllable amplifiers 5 and 12 form a controllable signal combiner.

To effect channel switching, the microprocessor 4 provides a channel selection signal to the tuner 1 over the bus 13. Simultaneously a switch-over signal is applied to a coincidence circuit 15 over connection 14. The vertical frequency signal provided by circuitry 9 is also coupled to coincidence circuit 15. Coincidence circuit 15 generates an enable signal on connection 16 when the vertical signal indicates the occurrence of vertical sync in the received video signal. The enable signal is initiated at horizontal line 17 of the vertical retrace, period to insure that the frame store circuitry 18 contains image data from a complete field or frame. The enable signal is coupled to the tuner 1, frame store 18 and control circuit 10 to simultaneously enable the tuner to change to the channel indicated by the signal on bus 13, switch the frame store from a write mode for storing video signal to a read mode for outputting stored video signal and to condition control circuit 10 to generate a control signal to disable amplifier 5 and enable amplifier 12. The duration of the control signal is selected to be long enough to insure that the system will synchronize to the new signal. At the termination of the control signal amplifier 5 is enabled to pass the video signal from the new channel at switch 3 and amplifier 12 is disabled. In this manner the switching arrangement provides continuous video signal to the video processing circuitry 7 which is synchronous with the system and precludes picture disturbance during channel switching.

What is claimed is:

1. Video signal processing apparatus comprising:
   a source for selectively providing alternative video signals, each of said alternative signals including horizontal and vertical synchronizing components;
   separating means, coupled to said source, for extracting at least said vertical synchronizing component;
   means coupled to said separating means for generating a control signal responsive to said extracted synchronizing components;
   image storage means coupled to said source for storing the selected video signal;
   video signal processing circuitry;
   controllable combining means, coupled to said source and said image storage means, for applying signal from said source to said video signal processing circuitry, and responsive to said control signal for applying stored video signal from said image storage means to said video signal processing circuitry for a predetermined period subsequent to a selection of an alternative video signal by said source, thereafter applying signal from said source, said controllable combining means including means for coupling signal from said source and said storage means in varying complementary proportions during transitions from applying signal from said storage means to applying signal from said source.

2. In a video signal processing system, circuitry for switching from a first video signal including a synchronizing component to a second video signal including a synchronizing component, said circuitry comprising:
   a source of said first and second video signals;
   image storage means for storing a video signal applied to an input port thereof and for reading stored video signal to an output port thereof;
   signal selection means for selectively providing said first video signal or said second video signal to the input port of the image storage means;
   means including controllable combining means, coupled to said image storage means and said signal selection means, for selectively providing to utilization means, video signal provided by said signal selection means, and during a predetermined interval subsequent said signal selection means being conditioned to switching between alternative video signals, providing video signal from said image storage means.

3. The video signal processing system set forth in claim 2, wherein said means including controllable combining means includes means for fading between alternative signals provided by said means including controllable combining means.

4. The video signal processing system set forth in claim 2 wherein said means including controllable combining means further includes means responsive to said synchronizing component of video signals provided by said signal selection means for conditioning said signal selection means and said controllable combining means to switch between alternative signals during vertical blanking intervals.

* * * * *